(12) United States Patent
Sakaguchi

(10) Patent No.: US 8,881,583 B2
(45) Date of Patent: Nov. 11, 2014

(54) ABRASION SENSING DEVICE, WIND TURBINE GENERATION APPARATUS INCLUDING THE SAME, AND ABRASION SENSING METHOD

(75) Inventor: Tomoya Sakaguchi, Kuwana (JP)

(73) Assignee: NTN Corporation, Osaka (JP)

( * ) Notice: Subject to any disclaimer, the term of this patent is extended or adjusted under 35 U.S.C. 154(b) by 240 days.

(21) Appl. No.: 13/634,390

(22) PCT Filed: Mar. 9, 2011

(86) PCT No.: PCT/JP2011/055467
§ 371 (c)(1),
(2), (4) Date: Sep. 12, 2012

(87) PCT Pub. No.: WO2011/111730
PCT Pub. Date: Sep. 15, 2011

(65) Prior Publication Data
US 2013/0008242 A1    Jan. 10, 2013

(30) Foreign Application Priority Data

Mar. 12, 2010 (JP) ................ 2010-056193
Mar. 3, 2011 (JP) ................ 2011-046247

(51) Int. Cl.
*G01M 15/02* (2006.01)
*G01M 15/04* (2006.01)
*F03D 11/00* (2006.01)
*F03D 7/02* (2006.01)
*F03D 11/02* (2006.01)

(52) U.S. Cl.
CPC ............ *F03D 11/02* (2013.01); *F05B 2260/83* (2013.01); *F03D 11/0091* (2013.01); *F05B 2270/702* (2013.01); *Y02E 10/722* (2013.01); *F05B 2260/4031* (2013.01); *F05B 2270/326* (2013.01); *F03D 7/0244* (2013.01); *Y02E 10/723* (2013.01); *F03D 7/0204* (2013.01); *F05B 2260/74* (2013.01)
USPC ........................................ 73/112.01; 415/118

(58) Field of Classification Search
CPC .................... F03D 11/0091; F05B 2260/83
USPC ........................................ 73/112.01; 415/118
See application file for complete search history.

(56) References Cited

U.S. PATENT DOCUMENTS 7,322,794 B2 * 1/2008 LeMieux et al. ................. 416/40
7,730,627 B2 * 6/2010 Mashue et al. ............... 33/501.7

(Continued)

FOREIGN PATENT DOCUMENTS

JP    2003-511657 A    3/2003
JP    2004-525295 A    8/2004

(Continued)

OTHER PUBLICATIONS

Verbruggen, "Wind Turbine Operation & Maintenance based on Condition Monitoring," Apr. 30, 2003, retrieved from Internet: URL:ftp://enc.nl/pub/ww/library/report/2003/c03047.pdf [retrieved on Mar. 6, 2012] pp. 1-39.

(Continued)

*Primary Examiner* — Peter Macchiarolo
*Assistant Examiner* — Natalie Huls
(74) *Attorney, Agent, or Firm* — McDermott Will & Emery LLP

(57) ABSTRACT

When it is determined that a blade is rotating, a control device operates a braking device, and acquires a rotation angle (first rotation angle) from a rotation angle sensor. Then, the control device reverses a nacelle and acquires again a rotation angle (second rotation angle) from the rotation angle sensor. Then, the control device determines whether or not the difference between the first rotation angle and the second rotation angle is greater than a threshold value. When it is determined that the rotation angle difference is greater than the threshold value, the control device determines that a gear or a bearing of a gearbox is worn out.

15 Claims, 11 Drawing Sheets

(56) References Cited

U.S. PATENT DOCUMENTS

| | | | |
|---|---|---|---|
| 7,914,250 B2* | 3/2011 | Behera et al. | 415/1 |
| 8,021,112 B2* | 9/2011 | Dinjus et al. | 416/1 |
| 8,317,462 B2* | 11/2012 | Daniels et al. | 415/123 |
| 8,568,099 B2* | 10/2013 | Sabannavar et al. | 416/170 R |
| 8,695,445 B2* | 4/2014 | Laurer et al. | 73/865.8 |
| 2004/0151578 A1 | 8/2004 | Wobben | |
| 2004/0236538 A1 | 11/2004 | Wobben | |
| 2006/0163882 A1 | 7/2006 | Brandt | |
| 2007/0058854 A1* | 3/2007 | Caskey et al. | 382/152 |
| 2007/0154128 A1 | 7/2007 | Mikami | |
| 2009/0193894 A1 | 8/2009 | Kabatzke | |
| 2010/0218609 A1* | 9/2010 | Reed et al. | 73/598 |
| 2011/0313726 A1* | 12/2011 | Parthasarathy et al. | 702/179 |
| 2012/0025526 A1* | 2/2012 | Luo et al. | 290/44 |
| 2013/0006540 A1* | 1/2013 | Sakaguchi et al. | 702/34 |

FOREIGN PATENT DOCUMENTS

| | | |
|---|---|---|
| JP | 2005-164314 A | 6/2005 |
| JP | 2006-161624 A | 6/2006 |
| JP | 2007-502382 A | 2/2007 |
| JP | 2008-082759 A | 4/2008 |
| JP | 2008-248928 A | 10/2008 |

OTHER PUBLICATIONS

Extended European Search Report issued in European Application No. 11753388.5 mailed Jan. 21, 2014, 5 pgs.

* cited by examiner

ABRASION SENSING DEVICE, WIND TURBINE GENERATION APPARATUS INCLUDING THE SAME, AND ABRASION SENSING METHOD

RELATED APPLICATIONS

This application is the U.S. National Phase under 35 U.S.C. §371 of International Application No. PCT/JP2011/055467, filed on Mar. 9, 2011, which in turn claims the benefit of Japanese Application No. 2010-056193 filed on Mar. 12, 2010, and Japanese Application No. 2011-046247 filed on Mar. 3, 2011, the disclosures of which Applications are incorporated by reference herein.

TECHNICAL FIELD

The present invention relates to an abrasion sensing device, a wind turbine generation apparatus including the same and an abrasion sensing method, and more particularly relates to an abrasion sensing device for detecting gear or bearing abrasion of a gearbox provided in a wind turbine generation apparatus, a wind turbine generation apparatus including the same and an abrasion sensing method.

BACKGROUND ART

Attention is focusing on a wind turbine generation apparatus as an environmentally-friendly power generation facility. The wind turbine generation apparatus generates electric power by rotating a main shaft connected to a blade that receives wind force, speeding up rotation of the main shaft by a gearbox, and then rotating a rotor of a power generator.

The gearbox increases the rotational speed of the main shaft (e.g., 10 to 30 rpm) by a gearbox mechanism to a rotational speed necessary for the power generator (e.g., 1200 to 1800 rpm). This gearbox is an essential part in the wind turbine generation apparatus, and high reliability is required of the gearbox.

One of damage modes of gearbox is gear or bearing abrasion. When gears are worn out, power generation efficiency will deteriorate, and as the degree of abrasion increases, the function as the gearbox may stop. When bearings are worn out, gear backlash will change, which not only degrades transmission efficiency, but also results in damage to the gears. Since a nacelle in which the gearbox is stored is placed at a high position, limits are imposed on in-situ abrasion sensing by an operator.

It is therefore desirable to enable gear or bearing abrasion in the gearbox in the wind turbine generation apparatus to be automatically sensed. Japanese Patent Laying-Open No. 2008-82579 (PTL 1) discloses an abrasion sensing mechanism that senses gear abrasion. This abrasion sensing mechanism is provided with first and second sensors that detect side faces of a gear tooth plane, and gear abrasion is sensed based on the time difference between timing at which a signal of the first sensor changes and timing at which a signal of the second sensor changes when rotating the gear (see PTL 1).

Japanese Patent Laying-Open No. 2005-164314 (PTL 2) discloses sensing bearing abrasion using an ultrasonic sensor, such as an ultrasonic microphone (see PTL 2).

CITATION LIST

Patent Literature

PTL 1: Japanese Patent Laying-Open No. 2008-82579
PTL 2: Japanese Patent Laying-Open No. 2005-164314

SUMMARY OF INVENTION

Technical Problem

In the technique disclosed in the above-described PTL 1, however, it is necessary to provide a plurality of sensors (e.g., optical sensors). Particularly since a large number of gears are used for the gearbox of the wind turbine generation apparatus, a very large number of sensors are required in the case of applying the above-described technique to detection of gear abrasion in a gearbox in a wind turbine generation apparatus, resulting in cost increase. Moreover, since the technique disclosed in the above-described publication detects the side faces of gear tooth planes by the sensors, adjustment of the sensors may be laborious.

Furthermore, in the technique through use of an ultrasonic sensor as described in the above-described PTL 2, the installation place is limited since ultrasonic waves have strong directivity and high attenuation rate in the air. Although abrasion at various positions may be able to be measured by providing a plurality of ultrasonic sensors, their development and verification is difficult and the installation cost is high.

The present invention was therefore made to solve such problems, and has an object to detect gear or bearing abrasion in a gearbox in a wind turbine generation apparatus at low cost and easily.

Solution to Problem

According to the present invention, an abrasion sensing device is an abrasion sensing device sensing abrasion of one of a gear and a bearing of a gearbox provided in a wind turbine generation apparatus. The wind turbine generation apparatus includes a blade converting wind force into rotary force, a main shaft receiving the rotary force from the blade, the gearbox speeding up rotation of the main shaft, a power generator connected to an output shaft of the gearbox, and a nacelle. The nacelle stores the main shaft, the gearbox and the power generator, and is rotatably supported at an upper part of a support. The abrasion sensing device includes a braking device, a rotation angle sensor, a control unit, and a determination unit. The braking device holds the output shaft of the gearbox in a non-rotating state. The rotation angle sensor detects a rotation angle of the main shaft. The control unit reverses, by changing a wind receiving state by the blade, the direction of the rotary force exerted on the main shaft by wind force. The determination unit determines presence/absence of abrasion of one of the gear and the bearing of the gearbox by comparing a first detected value of the rotation angle sensor before reversing the direction of the rotary force by the control unit and a second detected value of the rotation angle sensor after reversing the direction of the rotary force by the control unit while the braking device is being operated.

Preferably, the control unit includes a driving control unit for reversing the nacelle. The determination unit determines the presence/absence of abrasion of one of the gear and the bearing by comparing the first detected value before reversing the nacelle and the second detected value after reversing the nacelle by the driving control unit while the braking device is being operated.

More preferably, the control unit includes a driving control unit for reversing, by changing the angle of the blade, the direction of the rotary force exerted on the main shaft by wind force. The determination unit determines the presence/absence of abrasion of one of the gear and the bearing by comparing the first detected value before changing the angle of the blade and the second detected value after changing the angle of the blade by the driving control device while the braking device is being operated.

Preferably, when a difference between the first detected value and the second detected value exceeds a predetermined threshold value, the determination unit determines that one of the gear and the bearing is worn out.

Preferably, the threshold value is determined based on backlash of the gear, bearing inner clearance and elastic deformation of a component of the gearbox.

Preferably, the threshold value is determined based on the difference between the first detected value and the second detected value measured before transport of the wind turbine generation apparatus to the field.

Preferably, the threshold value is determined based on the difference between the first detected value and the second detected value measured immediately after installation or start of operation of the wind turbine generation apparatus.

Preferably, the determination unit starts processing of determining the presence/absence of abrasion of one of the gear and the bearing when the blade is rotating while receiving wind force. Still more preferably, an ideal case is that, although wind speed is too low for power generation, the main shaft is receiving such wind force of such a degree that it can race, and that the wind speed is relatively stable.

Preferably, the abrasion sensing device further includes a sensor for detecting torque generated by the wind turbine generation apparatus having received wind force. The determination unit determines the presence/absence of abrasion of one of the gear and the bearing based on a value obtained by compensating for a difference between the first detected value and the second detected value with a detected value of the sensor.

Preferably, the abrasion sensing device further includes a sensor for detecting torque generated by the wind turbine generation apparatus having received wind force, and a control unit. The control unit controls a detected value of the sensor to fall within a certain range by controlling at least one of the angle of the blade and the orientation of the nacelle.

Preferably, the abrasion sensing device further includes an iron powder sensor for detecting the amount of iron powder in a lubricating oil of the gearbox. The determination unit determines the presence/absence of abrasion of one of the gear and the bearing further using a detected value of the iron powder sensor.

Preferably, the frequency of determination processing performed by the determination unit is defined based on the detected value of the iron powder sensor.

Preferably, the abrasion sensing device further includes a vibration sensor for detecting the amount of vibration of one of the gearbox and a surrounding thereof. The determination unit determines the presence/absence of abrasion of one of the gear and the bearing further using a detected value of the vibration sensor.

Preferably, the frequency of determination processing performed by the determination unit is defined based on the detected value of the vibration sensor.

Preferably, the abrasion sensing device further includes a communications device for wirelessly transmitting a determination result by the determination unit to a remote receiving device.

Moreover, according to the present invention, the wind turbine generation apparatus includes any one of the abrasion sensing devices described above.

Moreover, according to the present invention, an abrasion sensing method is an abrasion sensing method for sensing abrasion of one of a gear and a bearing of a gearbox provided in a wind turbine generation apparatus. The wind turbine generation apparatus includes a blade converting wind force into rotary force, a main shaft receiving the rotary force from the blade, the gearbox speeding up rotation of the main shaft, a power generator connected to an output shaft of the gearbox, a nacelle, a braking device for holding the output shaft of the gearbox in a non-rotating state, and a rotation angle sensor for detecting a rotation angle of the main shaft. The nacelle stores the main shaft, the gearbox and the power generator, and is rotatably supported at an upper part of a support. The abrasion sensing method includes the steps of operating the braking device, detecting a first rotation angle indicating the rotation angle of the main shaft, reversing, by changing a wind receiving state by the blade, the direction of rotary force exerted on the main shaft by wind force, detecting a second rotation angle indicating the rotation angle of the main shaft after reversing the direction of the rotary force, and determining presence/absence of abrasion of one of the gear and the bearing by comparing the first rotation angle and the second rotation angle.

Preferably, the step of reversing the direction of the rotary force includes the step of reversing the nacelle. The step of detecting the second rotation angle includes the step of detecting the second rotation angle after reversing the nacelle.

More preferably, the step of reversing the direction of the rotary force includes the step of reversing, by changing the angle of the blade, the direction of the rotary force exerted on the main shaft by wind force. The step of detecting the second rotation angle includes the step of detecting the second rotation angle after changing the angle of the blade.

Preferably, in the step of determining, when a difference between the first rotation angle and the second rotation angle exceeds a predetermined threshold value, the determination unit determines that one of the gear and the bearing is worn out.

Preferably, a sequential procedure including the respective steps is executed when the blade is rotating while receiving wind force. Still more preferably, the sequential procedure is executed in the case where, although wind speed is too low for power generation, the main shaft is receiving such wind force of such a degree that it can rotate idly, and the wind speed is relatively stable.

Preferably, the wind turbine generation apparatus further includes an iron powder sensor for detecting the amount of iron powder in a lubricating oil of the gearbox. The abrasion sensing method further includes the step of detecting the amount of iron powder in a lubricating oil of the gearbox. In the step of determining, the presence/absence of abrasion of one of the gear and the bearing is determined further using a detected value of the iron powder sensor.

Preferably, the frequency of performing processing of determining the presence/absence of abrasion of one of the gear and the bearing is defined based on the detected value of the iron powder sensor.

Preferably, the wind turbine generation apparatus further includes a vibration sensor for detecting the amount of vibration of one of the gearbox and a surrounding thereof. The abrasion sensing method further includes the step of detecting the amount of vibration by the vibration sensor. In the step of determining, the presence/absence of abrasion of one of the gear and the bearing is determined further using a detected value of the vibration sensor.

Preferably, the frequency of performing processing of determining the presence/absence of abrasion of one of the gear and the bearing is defined based on the detected value of the vibration sensor.

Preferably, the abrasion sensing method further includes the step of wirelessly transmitting a determination result by the step of determining to a remote receiving device.

Advantageous Effects of Invention

In the present invention, a braking device for holding the output shaft of the gearbox in a non-rotating state, a rotation angle sensor for detecting a rotation angle of the main shaft, and a control unit for reversing, by changing a wind receiving state by the blade, the direction of the rotary force exerted on the main shaft by wind force are provided. Then, the presence/absence of abrasion of the gear or the bearing is determined by comparing the rotation angle of the main shaft before reversing the direction of the rotary force and the rotation angle of the main shaft after reversing the direction of the rotary force while the braking device is being operated. Therefore, according to the present invention, gear or bearing abrasion in the gearbox in the wind turbine generation apparatus can be detected at low cost and easily.

DESCRIPTION OF EMBODIMENTS

Figure 1:
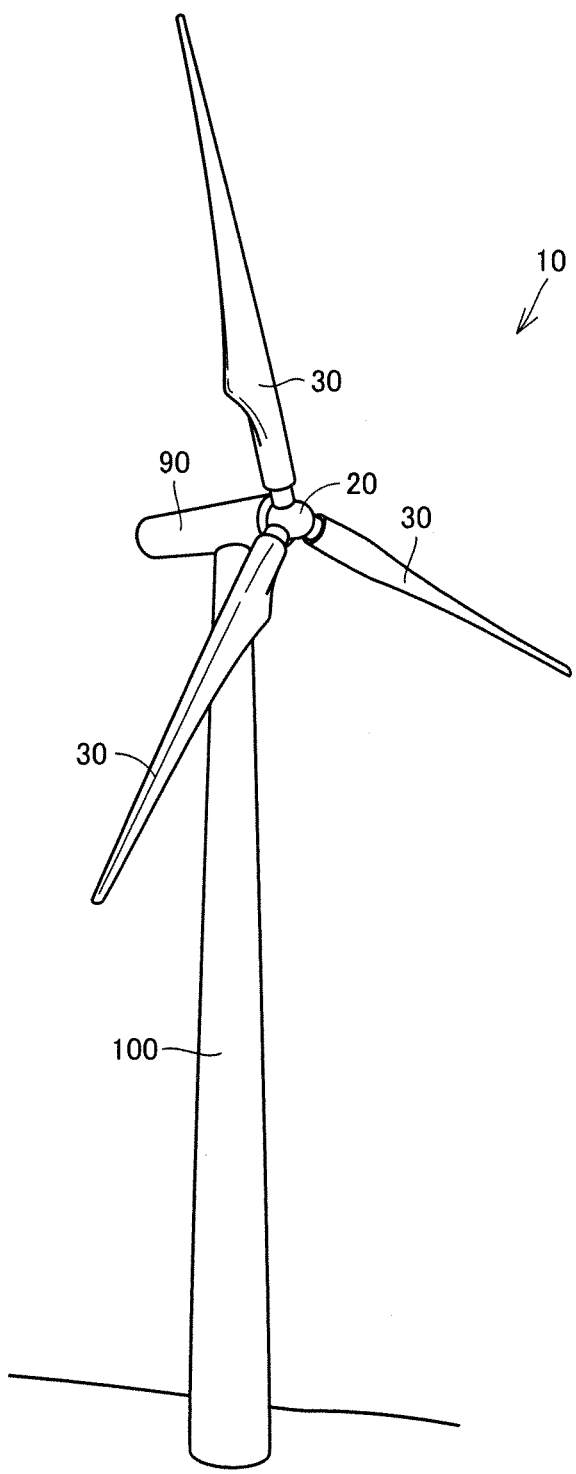
FIG. 1 is an outline view of a wind turbine generation apparatus to which an abrasion sensing device according to a first embodiment of the present invention is applied.

Embodiments of the present invention will be described in detail below with reference to the drawings. It is noted that the same or corresponding portions in the drawings have the same reference characters allotted, and description thereof will not be repeated.

First Embodiment

FIG. 1 is an outline view of a wind turbine generation apparatus to which an abrasion sensing device according to a first embodiment of the present invention is applied. Referring to FIG. 1, a wind turbine generation apparatus 10 includes a main shaft 20, blades 30, a nacelle 90, and a tower 100. Blades 30 are attached to main shaft 20 circumferentially. Main shaft 20 enters nacelle 90, and is connected to an input shaft of a gearbox with a power generator connected to its output shaft (not shown).

Nacelle 90 is rotatably supported at the upper part of tower 100, and a yaw angle of nacelle 90 is controlled depending on the wind direction. The pitch angle of the blade (angle of a wind receiving surface of blade 30) is also controlled as appropriate depending on wind force and the like.

Figure 2:
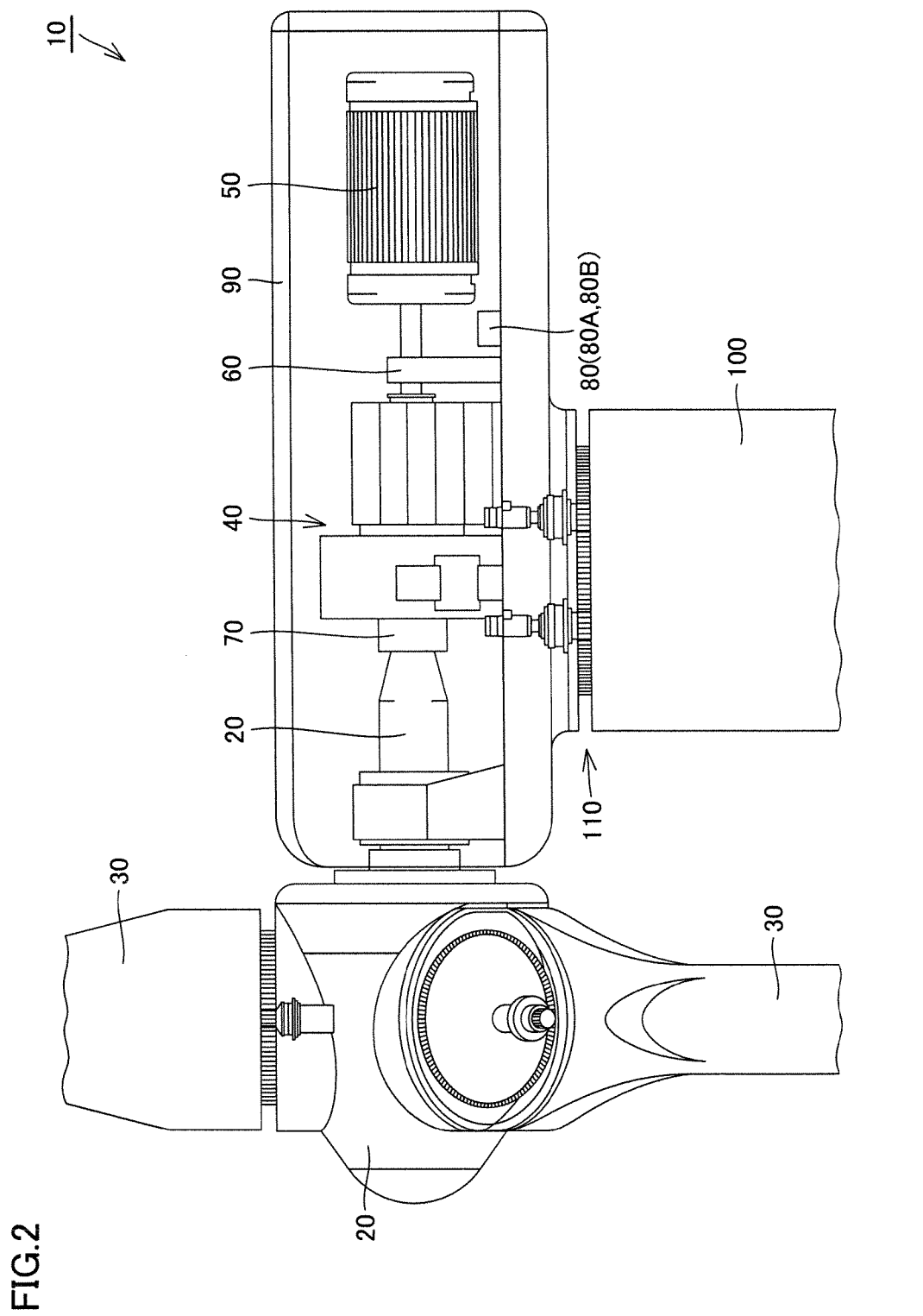
FIG. 2 is a diagram showing in more detail the structure of the wind turbine generation apparatus.

FIG. 2 is a diagram showing in more detail the structure of wind turbine generation apparatus 10. Referring to FIG. 2, wind turbine generation apparatus 10 includes main shaft 20, blades 30, a gearbox 40, a power generator 50, a braking device 60, a rotation angle sensor 70, a control device 80, nacelle 90, tower 100, and a yaw driving device 110. Part of main shaft 20, gearbox 40, power generator 50, braking device 60, rotation angle sensor 70, and control device 80 are stored in nacelle 90. Nacelle 90 is rotatably supported on tower 100 by yaw driving device 110.

Main shaft 20 enters nacelle 90 to be connected to the input shaft of gearbox 40. Main shaft 20 transmits rotary force produced by blade 30 having received wind force, to the input shaft of gearbox 40. Blade 30 is provided at the leading end of main shaft 20, and converts wind force into rotary force for transmission to main shaft 20.

Gearbox 40 is provided between main shaft 20 and power generator 50, and increases the rotational speed of main shaft 20 for output to power generator 50. Gearbox 40 is implemented by a gearbox mechanism including a planetary gear, an intermediate shaft, a high-speed shaft, and the like. The structure of gearbox 40 will be explained later in detail. Power generator 50 is connected to the output shaft of gearbox 40, and generates electric power by means of rotary force received from gearbox 40. Power generator 50 is implemented by an induction generator, for example.

Braking device 60 is provided on the output shaft of gearbox 40. Braking device 60 can hold the output shaft of gearbox 40 in a non-rotating state based on a driving command from control device 80.

Rotation angle sensor 70 detects the rotation angle of the input shaft of gearbox 40 (corresponding to the rotation angle of main shaft 20), and outputs a detected value to control device 80. Rotation angle sensor 70 is implemented by a rotary encoder, for example.

When predetermined conditions are met, control device 80 executes abrasion sensing processing for gearbox 40 in accordance with a program or the like prepared in advance. Specifically, control device 80 outputs a driving command to braking device 60, and acquires a detected value of rotation angle sensor 70 after the output shaft of gearbox 40 stops rotating (which will be referred to as a first detected value). It is noted that the output shaft of gearbox 40 is held in the non-rotating state by braking device 60 until a sequential procedure of abrasion sensing processing is terminated.

When the first detected value is acquired, control device 80 outputs a driving command for reversing nacelle 90 to yaw driving device 110, and acquires a detected value of rotation angle sensor 70 after reversing nacelle 90 (which will be referred to as a second detected value). Control device 80 then determines the presence/absence of gear abrasion in gearbox 40 by comparing the acquired second detected value with the first detected value before reversing nacelle 90.

That is, when gears of gearbox 40 are worn out, gear backlash increases due to gear displacement and/or abrasion of the tooth planes. Therefore, in this first embodiment, the detected value of rotation angle sensor 70 before reversing nacelle 90 (first detected value) and the detected value of rotation angle sensor 70 after reversing nacelle 90 (second detected value) are compared while braking device 60 is being operated. When the difference between the first detected value and the second detected value exceeds a predetermined threshold value (large backlash), it shall be determined that gears of gearbox 40 are worn out.

It is noted that, to execute the above-described abrasion sensing, gears of gearbox 40 are required to transmit torque. Therefore, the starting conditions for starting abrasion sensing processing can be such that blade 30 is rotating and a predetermined time has elapsed since execution of previous abrasion sensing processing, for example. Alternatively, it may be configured that execution of abrasion sensing processing can be remotely instructed wirelessly or by other means, and the starting conditions may be such that blade 30 is rotating and execution of abrasion sensing processing has been instructed.

Figure 3:
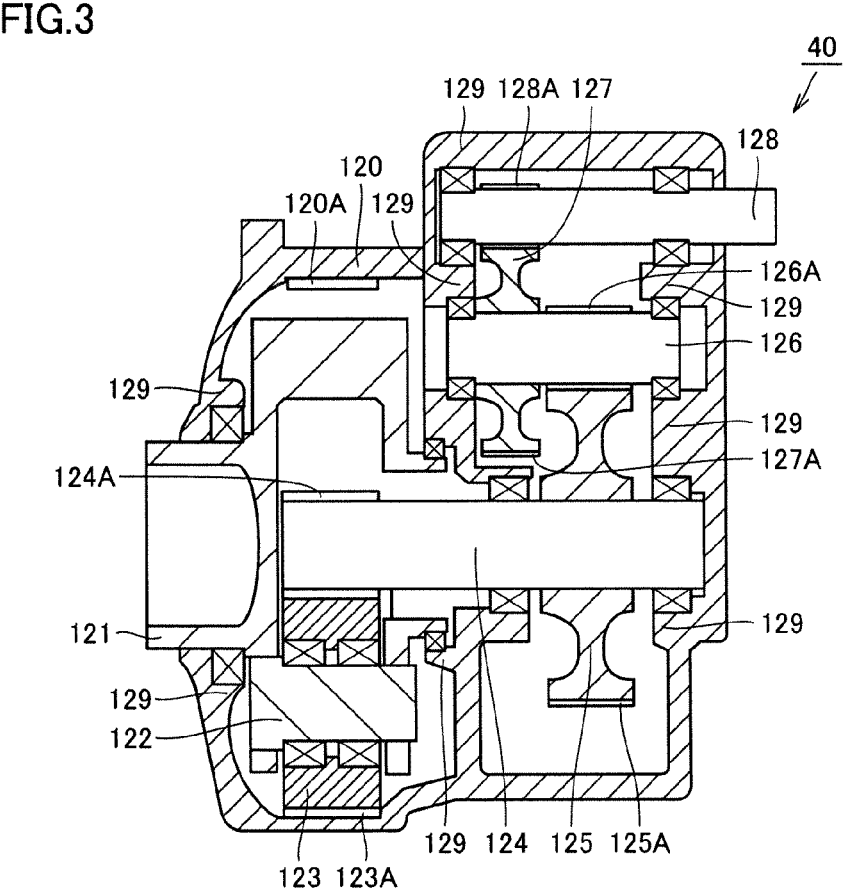
FIG. 3 is a cross sectional view of a gearbox for explaining the structure of a gearbox shown in FIG. 2.

FIG. 3 is a cross sectional view of gearbox 40 for explaining the structure of gearbox 40 shown in FIG. 2. Referring to FIG. 3, gearbox 40 includes an input shaft 121, a planetary carrier 122, a planetary gear 123, a low-speed shaft 124, an outer ring gear 120, a low-speed gear 125, a mid-speed shaft 126, a mid-speed gear 127, a high-speed shaft 128, and a housing 129.

Input shaft 121 is connected to main shaft 20 (FIG. 2). Planetary carrier 122 is connected to input shaft 121 via an arm part radially extending from input shaft 121. Planetary gear 123 has a gear portion 123A formed on its outer circumferential surface, and is disposed to surround the outer circumferential surface of planetary carrier 122. Low-speed shaft 124 has formed on its outer circumferential surface a gear portion 124A always engaged with gear portion 123A of planetary gear 123. Outer ring gear 120 has formed on its inner circumferential surface a gear portion 120A always engaged with gear portion 123A of planetary gear 123.

Low-speed gear 125 has an annular shape, and is fixed to the outer circumferential surface of low-speed shaft 124. Low-speed gear 125 has a gear portion 125A formed on its outer circumferential surface. Mid-speed shaft 126 has formed on its outer circumferential surface a gear portion 126A always engaged with gear portion 125A of low-speed gear 125. Mid-speed gear 127 has an annular shape, and is fixed to the outer circumferential surface of mid-speed shaft 126. Mid-speed gear 127 has a gear portion 127A formed on its outer circumferential surface. High-speed shaft 128 has formed on its outer circumferential surface a gear portion 128A always engaged with gear portion 127A of mid-speed gear 127.

Input shaft 121 and planetary carrier 122 are rotatably supported by rolling bearings relative to housing 129 disposed opposite to their outer circumferential surfaces. Between planetary carrier 122 and planetary gear 123, two rolling bearings are arranged side by side in the axial direction. Planetary carrier 122 and planetary gear 123 are rotatable relative to each other. Further, low-speed shaft 124, mid-speed shaft 126 and high-speed shaft 128 are rotatably supported by rolling bearings relative to housing 129 disposed opposite to their outer circumferential surfaces.

In this gearbox 40, main shaft 20 is connected to input shaft 121, and input shaft 121 is rotated in response to rotation of blade 30 (FIG. 2). When input shaft 121 is rotated, planetary carrier 122 is revolved in a space between low-speed shaft 124 and outer ring gear 120 disposed to surround low-speed shaft 124. In response to this movement of planetary carrier 122, planetary gear 123 is rotated on its axis and is revolved around low-speed shaft 124 while gear portion 123A of planetary gear 123 is engaged with both gear portion 120A of outer ring gear 120 and gear portion 124A of low-speed shaft 124. As a result, low-speed shaft 124 is rotated around its axis in accordance with the relationship between the number of teeth of gear portion 120A of outer ring gear 120 and the number of teeth of gear portion 124A of low-speed shaft 124.

When low-speed shaft 124 is rotated, low-speed gear 125 is rotated together with low-speed shaft 124, which causes rotation of mid-speed shaft 126 having gear portion 126A engaged with gear portion 125A of low-speed gear 125. On this occasion, the rotation of low-speed shaft 124 is speeded up according to a speed-up ratio corresponding to a ratio of the number of teeth of gear portion 125A of low-speed gear 125 to the number of teeth of gear portion 126A of mid-speed shaft 126, and is transmitted to mid-speed shaft 126. Further, when mid-speed shaft 126 is rotated, mid-speed gear 127 is rotated together with mid-speed shaft 126, which causes rotation of high-speed shaft 128 having gear portion 128A engaged with gear portion 127A of mid-speed gear 127. On this occasion, the rotation of mid-speed shaft 126 is speeded up according to a speed-up ratio corresponding to a ratio of the number of teeth of gear portion 127A of mid-speed gear 127 to the number of teeth of gear portion 128A of high-speed shaft 128, and is transmitted to high-speed shaft 128.

As described above, rotation of main shaft 20 is speeded up by gearbox 40 and is output to cause rotation of the output shaft connected to high-speed shaft 128.

Figure 4:
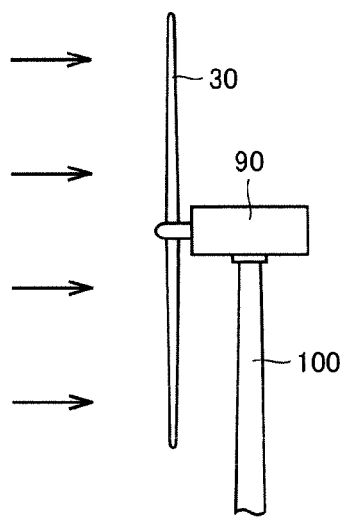
FIG. 4 is a first diagram for explaining an operation of a nacelle when abrasion sensing processing for the gearbox is executed.
Figure 5:
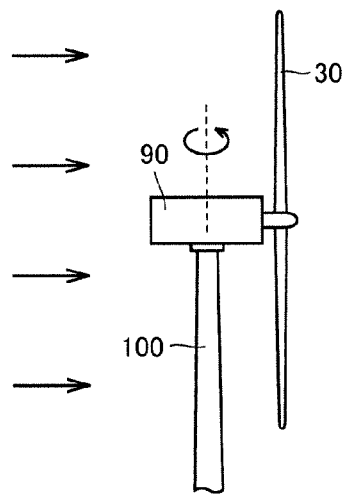
FIG. 5 is a second diagram for explaining an operation of the nacelle when abrasion sensing processing for the gearbox is executed.

FIGS. 4 and 5 are diagrams for explaining operations of nacelle 90 when abrasion sensing processing for gearbox 40 is executed. Referring to FIG. 4, when blade 30 is rotating while receiving wind force, abrasion sensing processing for gearbox 40 is started. As described above, the output shaft of gearbox 40 is held in the non-rotating state by braking device 60, and a first rotation angle indicating the rotation angle of main shaft 20 at that occasion is detected by rotation angle sensor 70 (first detected value).

Referring to FIG. 5, when the first rotation angle is detected, nacelle 90 is reversed with braking device 60 being operated. When the reversal of nacelle 90 is completed, a second rotation angle indicating the rotation angle of main shaft 20 at that occasion is detected by rotation angle sensor 70 (second detected value). When the difference between the first detected value and the second detected value (hereinafter also referred to as a "rotation angle difference") exceeds a predetermined threshold value, it is determined that gears of gearbox 40 are worn out.

This threshold value may be determined based on gear backlash and elastic deformation of each component. However, in the case of determining the above-described threshold value in consideration of processing tolerance of each component, the threshold value needs to be set at a value with a margin in order to assume every combination of components whose processing tolerances fall within a normal range to be normal. In this case, the difference between an initial value of the above-described rotation angle difference and the above-described threshold value is great, and abrasion may be undetectable unless excessively large gear abrasion occurs.

Therefore, it is preferable to measure the above-described rotation angle difference in the state where abrasion has not progressed and to determine the above-described threshold value based on its initial value. For example, the above-described threshold value may be determined with reference to a value measured immediately after manufacture of the wind turbine generation apparatus, or immediately after installation or start of operation of the wind turbine generation apparatus. As an example, the threshold value can be set at 1.3 times the initial value of the above-described rotation angle difference. This value may be determined experientially through experiments and/or performances.

It is noted that, assuming a value measured immediately after manufacture of components (before transport to the field) to be the above-described threshold value, abnormal abrasion occurred during transport to the field can also be take into consideration. In this case, however, it is necessary to add a step to the manufacturing stage. In the case where the problem at the transport stage is small, the addition of step at the manufacturing stage as mentioned above can be preferably omitted if the above-described threshold value is set at a value measured automatically using the present device after installing the wind turbine generation apparatus.

Figure 6:
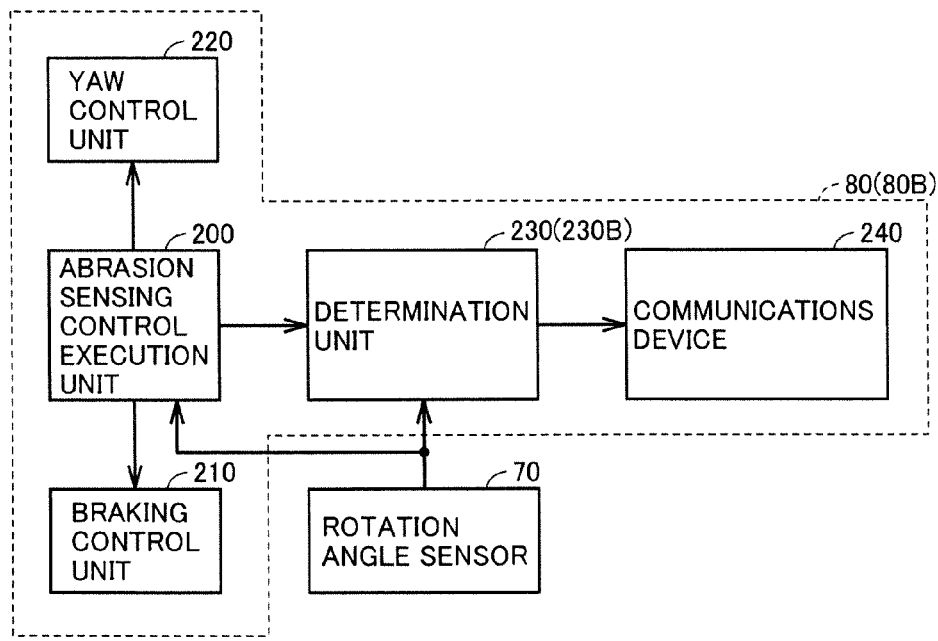
FIG. 6 is a functional block diagram of a control device shown in FIG. 2.

FIG. 6 is a functional block diagram of control device 80 shown in FIG. 2. Referring to FIG. 6, control device 80 includes an abrasion sensing control execution unit 200, a braking control unit 210, a yaw control unit 220, a determination unit 230, and a communications device 240.

Abrasion sensing control execution unit 200 determines the start of abrasion sensing processing. For example, when it is determined that blade 30 is rotating based on a detected value of rotation angle sensor 70 and when a predetermined time has elapsed since execution of previous abrasion sensing processing, abrasion sensing control execution unit 200 starts abrasion sensing processing.

First, abrasion sensing control execution unit 200 outputs a command to braking control unit 210 such that braking device 60 is operated. Then, when braking device 60 is operated to hold the output shaft of gearbox 40 in the non-rotating state, abrasion sensing control execution unit 200 outputs a first command to determination unit 230 so as to acquire a detected value of rotation angle sensor 70.

Subsequently, abrasion sensing control execution unit 200 outputs a command to yaw control unit 220 such that nacelle 90 is reversed. Then, when yaw driving device 110 (FIG. 2) is operated and nacelle 90 is reversed, abrasion sensing control execution unit 200 outputs a second command to determination unit 230 so as to acquire a detected value of rotation angle sensor 70 again.

Upon receipt of the command from abrasion sensing control execution unit 200, braking control unit 210 outputs a driving command to braking device 60 to operate braking device 60. Upon receipt of the command from abrasion sensing control execution unit 200, yaw control unit 220 outputs a driving command for reversing nacelle 90 from a current position to yaw driving device 110, so that reverse nacelle 90 is reversed.

Upon receipt of the first command from abrasion sensing control execution unit 200, determination unit 230 acquires a detected value of the rotation angle of main shaft 20 from rotation angle sensor 70. Determination unit 230 sets the acquired detected value as the first detected value before reversing the nacelle. Upon receipt of the second command from abrasion sensing control execution unit 200, determination unit 230 acquires again a detected value of the rotation angle of main shaft 20 from rotation angle sensor 70. Determination unit 230 sets the acquired detected value as the second detected value after reversing the nacelle.

When the second detected value is acquired, determination unit 230 calculates the difference between the first detected value and the second detected value (rotation angle difference). When the calculated value exceeds a predetermined threshold value, determination unit 230 determines that gear abrasion in gearbox 40 has occurred. Then, determination unit 230 outputs the determination result of gear abrasion to communications device 240. Upon receipt of the determination result of gear abrasion from determination unit 230, communications device 240 wirelessly transmits the received determination result to a remote communications server not shown.

Figure 7:
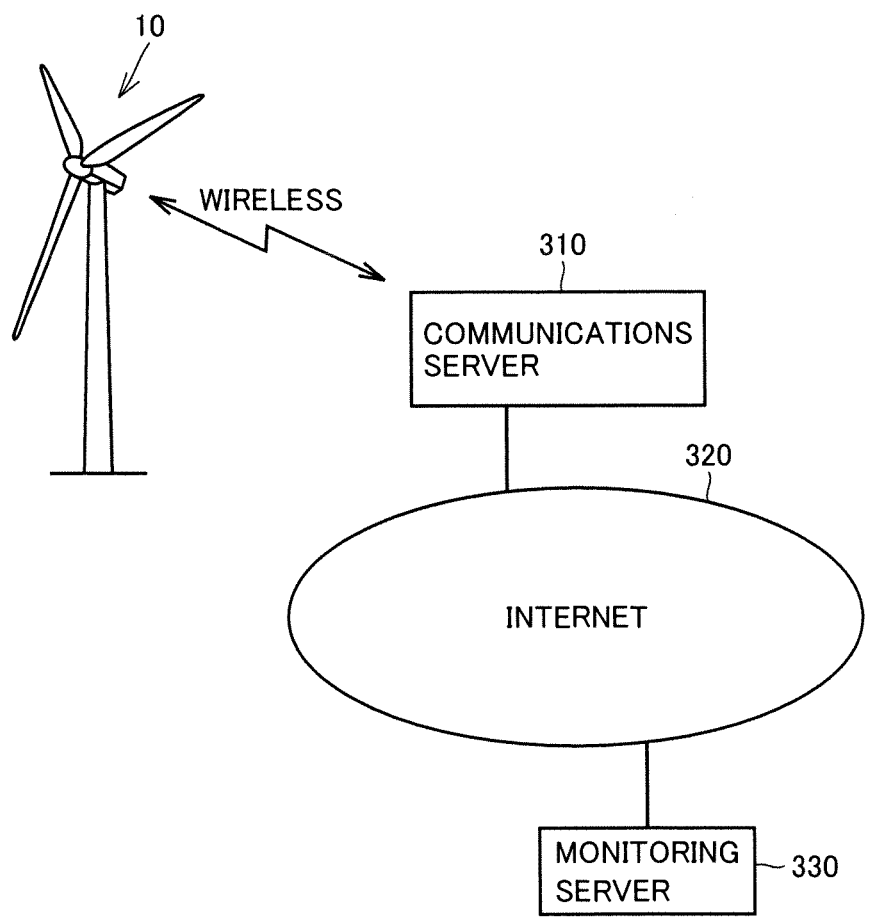
FIG. 7 is a diagram schematically showing the overall structure of a monitoring system remotely monitoring abrasion in the gearbox.

FIG. 7 is a diagram schematically showing the overall structure of a monitoring system remotely monitoring abrasion in gearbox 40. Referring to FIG. 7, the monitoring system includes wind turbine generation apparatus 10, a communications server 310, Internet 320, and a monitoring server 330. Wind turbine generation apparatus 10 wirelessly outputs the determination result of gear abrasion in gearbox 40 to communications server 310.

Communications server 310 is connected to Internet 320. Communications server 310 receives data transmitted wirelessly from wind turbine generation apparatus 10, and outputs the received data to monitoring server 330 through Internet 320. Monitoring server 330 is connected to Internet 320. Monitoring server 330 receives data from communications server 310 through Internet 320. It can thereby be recognized in monitoring server 330 distant from wind turbine generation apparatus 10 as to whether or not gear abrasion has occurred in gearbox 40 of wind turbine generation apparatus 10.

Figure 8:
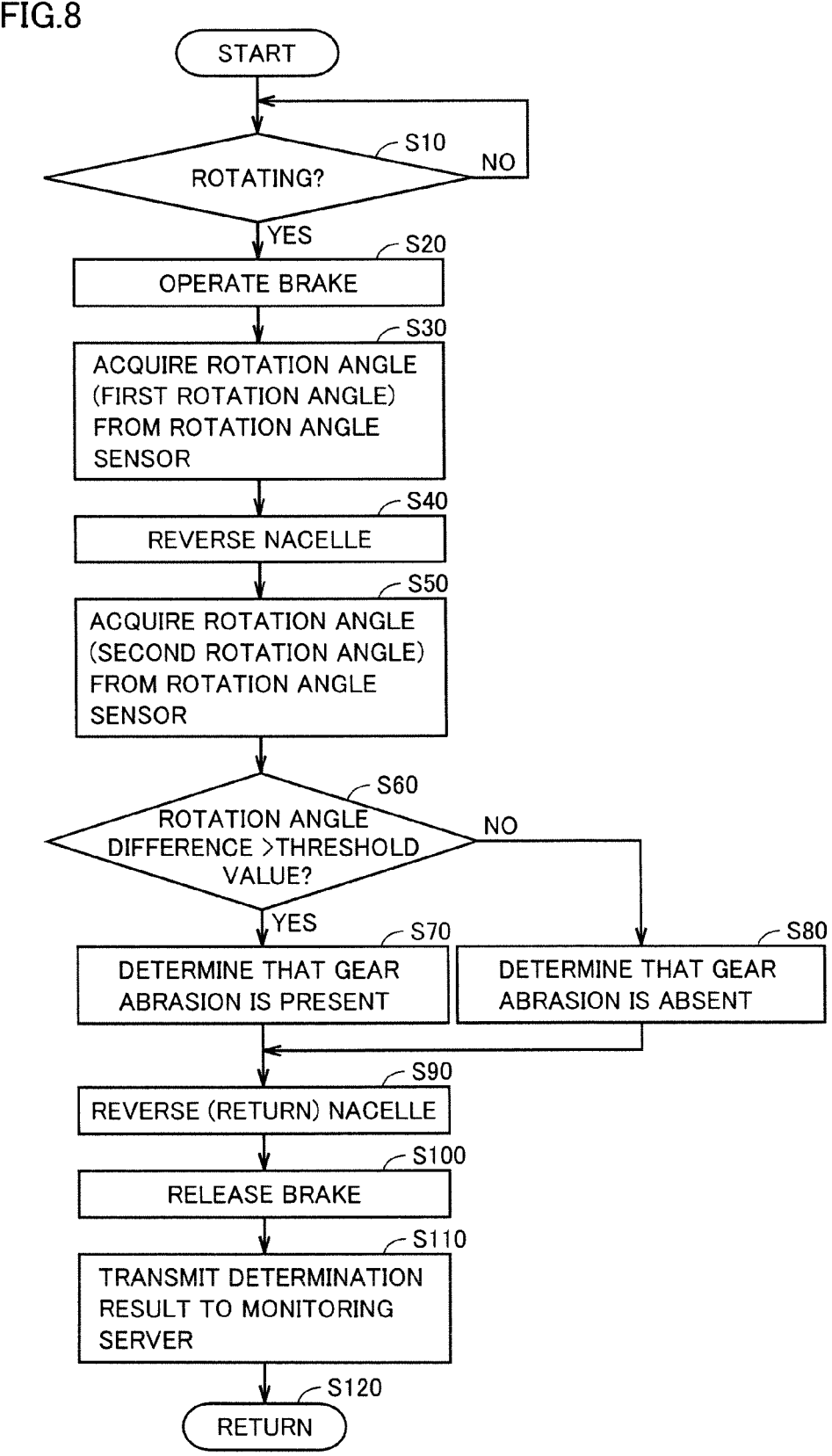
FIG. 8 is a flowchart for explaining a sequential procedure of abrasion detection processing executed in the wind turbine generation apparatus.

FIG. 8 is a flowchart for explaining a sequential procedure of abrasion sensing processing executed in wind turbine generation apparatus 10. It is noted that processing of this flowchart is invoked from a main routine and executed when a predetermined time has elapsed since execution of previous abrasion sensing processing, for example.

Referring to FIG. 8, control device 80 determines whether or not blade 30 is rotating based on a detected value of rotation angle sensor 70 (Step S10). When it is determined that blade 30 is rotating (YES in Step S10), control device 80 operates braking device 60 (Step S20). When braking device 60 is operated and the output shaft of gearbox 40 is held in the non-rotating state, control device 80 acquires a detected value of the rotation angle of main shaft 20 (first rotation angle) from rotation angle sensor 70 (Step S30).

Subsequently, control device 80 reverses nacelle 90 with braking device 60 being operated (Step S40). When nacelle 90 is reversed, control device 80 acquires a detected value of the rotation angle of main shaft 20 (second rotation angle) from rotation angle sensor 70 (Step S50). Then, control device 80 calculates the rotation angle difference between the first rotation angle and the second rotation angle, and determines whether or not the calculated rotation angle difference is greater than the predetermined threshold value (Step S60).

When it is determined in Step S60 that the rotation angle difference of main shaft 20 before and after reversing the nacelle is greater than the threshold value (YES in Step S60), control device 80 determines that gear abrasion has occurred in gearbox 40 (Step S70). On the other hand, when it is determined in Step S60 that the rotation angle difference of main shaft 20 before and after reversing the nacelle is less than or equal to the threshold value (NO in Step S60), control device 80 determines that gear abrasion has not occurred in gearbox 40 (Step S80).

When the determination of presence/absence of gear abrasion in gearbox 40 is completed, control device 80 reverses nacelle 90 again to be returned to its original position (Step S90), and then releases braking by braking device 60 (Step S100). Control device 80 then wirelessly transmits the determination result of presence/absence of gear abrasion in Step S70 or S80 to monitoring server 330 (FIG. 7) (Step S110).

As described above, in this first embodiment, braking device 60 holding the output shaft of gearbox 40 in the non-rotating state, rotation angle sensor 70 detecting the rotation angle of main shaft 20, and control device 80 operating braking device 60 to reverse nacelle 90 are provided. The presence/absence of gear abrasion in gearbox 40 is determined by comparing the rotation angle of main shaft 20 before reversing nacelle 90 and the rotation angle of main shaft 20 after reversing nacelle 90 while braking device 60 is being operated. Therefore, according to this first embodiment, gear abrasion in gearbox 40 in wind turbine generation apparatus 10 can be detected at low cost and easily.

Moreover, in this first embodiment, since the determination result of presence/absence of gear abrasion shall be transmitted to distant monitoring server 330 using wireless communications, the presence/absence of gear abrasion in gearbox 40 can be monitored at a remote place. Therefore, according to this first embodiment, maintenance of gearbox 40 is facilitated.

It is noted that, since the output shaft of gearbox 40 is braked to reverse nacelle 90 and a torsional angle of main shaft 20 is detected as described above, rotational torque by which main shaft 20 is fully twisted before and after reversing nacelle 90, that is, rotational torque of main shaft 20 greater than slight movements of gears and/or friction of support bearings, is required, which requires a certain degree of wind speed. However, to reduce the load on blade 30 due to wind force and/or the load capacity of braking device 60, it is preferable that the wind speed be not excessively great. However, gear abrasion is difficult to sense in a situation that the wind speed changes vigorously and is unstable. Therefore, although it is insufficient for power generation, the above-described abnormality detection processing is preferably executed at such a wind speed that main shaft 20 can race.

Second Embodiment

In this second embodiment, an iron powder sensor for detecting the amount of iron powder contained in a lubricating oil in gearbox 40 (FIG. 2) is further provided, and the presence/absence of gear abrasion in gearbox 40 is determined further using a detected value of the iron powder sensor.

Figure 9:
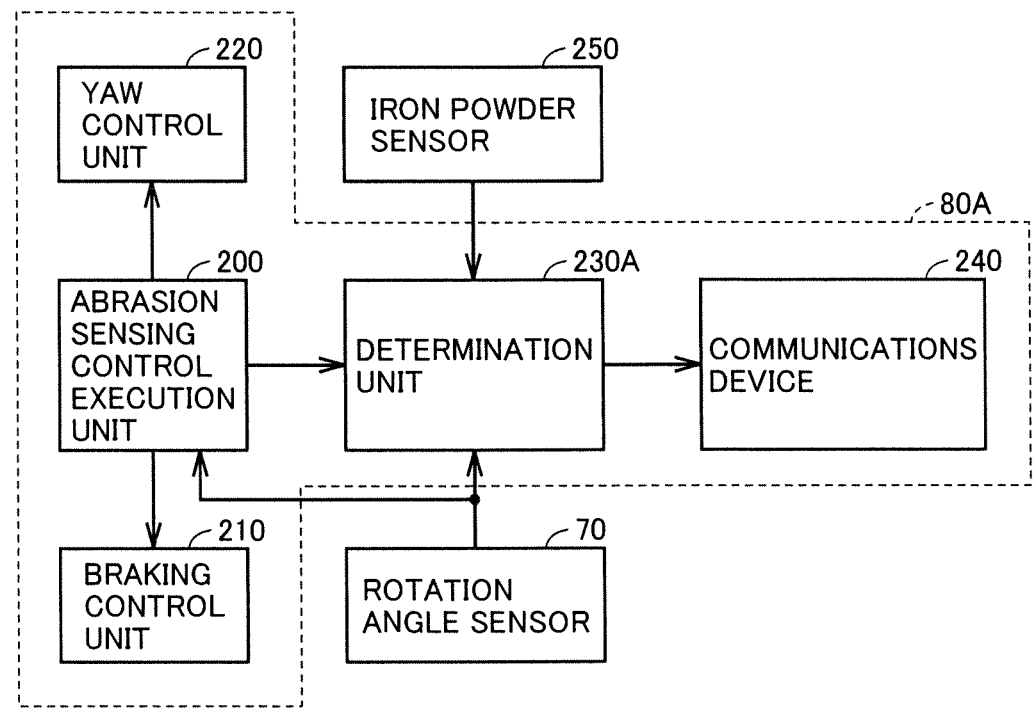
FIG. 9 is a functional block diagram of a control device and an iron powder sensor in a second embodiment.

FIG. 9 is a functional block diagram of a control device and the iron powder sensor in the second embodiment. Referring to FIG. 9, an iron powder sensor 250 detects the amount of iron powder contained in the lubricating oil in gearbox 40, and outputs the detected value to a control device 80A. Iron powder sensor 250 is composed of, for example, an electrode with a magnet built therein and a rod-like electrode, and is provided on a circulation path of the lubricating oil in gearbox 40. Iron powder sensor 250 captures iron powder contained in the lubricating oil by the magnet, and outputs a signal when adhesion of iron powder causes an electric resistance between the electrodes to drop to a set value or below. That is, when gears of gearbox 40 are worn out, iron powder resulting from abrasion is mixed with the lubricating oil, and therefore, gear abrasion in gearbox 40 can be sensed by detecting the amount of iron powder contained in the lubricating oil in gearbox 40 by iron powder sensor 250.

Although not particularly shown, an optical sensor detecting contamination of the lubricating oil in accordance with light transmittance may be used in place of magnetic iron powder sensor 250 described above. For example, the optical sensor directs light of a light emitting element to the lubricating oil to detect the amount of gear abrasion powder in the lubricating oil in accordance with changes in intensity of light arrived at the light receiving element. It is noted that light transmittance is defined by a ratio between an output value of the light receiving element in the state where there is no foreign substance mixed in the lubricating oil and an output value of the light receiving element when ferrous oxide has been mixed. When the transmittance exceeds a set value, it can be determined that gear abrasion has occurred.

Control device 80A includes a determination unit 230A in place of determination unit 230 in the configuration of control device 80 in the first embodiment shown in FIG. 6. Determination unit 230A determines whether or not the difference between the rotation angle of main shaft 20 detected by rotation angle sensor 70 before reversing nacelle 90 (first detected value) and the rotation angle of main shaft 20 detected after reversing nacelle 90 (second detected value) exceeds a predetermined threshold value, and also determines whether or not the detected value of iron powder sensor 250 exceeds a predetermined threshold value, thereby determining whether or not gear abrasion in gearbox 40 has occurred based on these determination results.

For example, even if the difference between the first detected value and the second detected value does not exceed the threshold value, it may be determined that gear abrasion has occurred when the detected value of iron powder sensor 250 exceeds its threshold value. This is effective when although gears currently engaged are less worn out, other gears are severely worn out. The threshold value for the detected value of iron powder sensor 250 in this case may be a value at the time when a comparatively large amount of abrasion powder is sensed. It is noted that it may be determined that gear abrasion has occurred when the difference between the first detected value and the second detected value exceeds its threshold value and when the detected value of iron powder sensor 250 exceeds its threshold value. The threshold value for the detected value of iron powder sensor 250 in this case may be a value at the time when a comparatively small amount of abrasion powder is sensed.

It is noted that the remaining configuration of control device 80A is identical to that of control device 80 in the first embodiment shown in FIG. 6.

Figure 10:
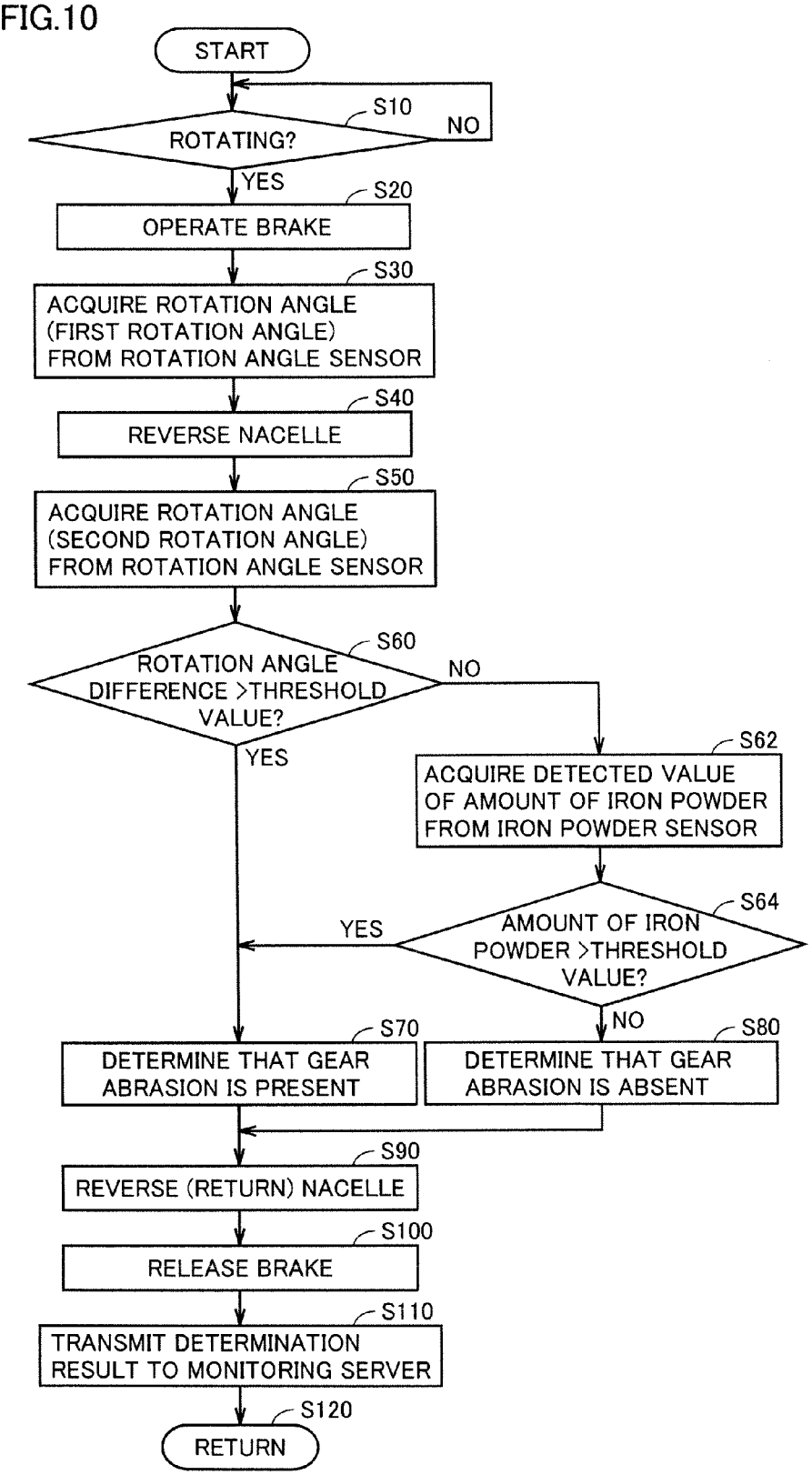
FIG. 10 is a flowchart for explaining a sequential procedure of abrasion detection processing in the second embodiment.

FIG. 10 is a flowchart for explaining a sequential procedure of abrasion detection processing in the second embodiment. It is noted that processing of this flowchart is also invoked from the main routine and executed when a predetermined time has elapsed since execution of previous gear abrasion sensing processing, for example.

Referring to FIG. 10, this flowchart further includes steps S62 and S64 in the flowchart shown in FIG. 8. That is, when it is determined in Step S60 that the rotation angle difference of main shaft 20 before and after reversing nacelle 90 is less than or equal to a predetermined threshold value (NO in Step S60), control device 80A acquires a detected value of the amount of iron powder contained in the lubricating oil in gearbox 40 from iron powder sensor 250 (Step S62).

Subsequently, control device 80A determines whether or not the detected amount of iron powder is larger than a predetermined threshold value (Step S64). When it is determined that the detected amount of iron powder is larger than the threshold value (YES in Step S64), the process proceeds to Step S70, where it is determined that gear abrasion in gearbox 40 has occurred. On the other hand, when it is determined that the detected amount of iron powder is less than or equal to the threshold value (NO in Step S64), the process proceeds to Step S80, where it is determined that gear abrasion in gearbox 40 has not occurred.

It is noted that the remaining processing in the flowchart shown in FIG. 10 is identical to the processing in the flowchart shown in FIG. 8.

As described above, according to this second embodiment, since iron powder sensor 250 for detecting the amount of iron powder contained in the lubricating oil in gearbox 40 is further provided, and the presence/absence of gear abrasion in gearbox 40 shall be determined further using the detected value of iron powder sensor 250, abrasion determination of higher precision can be achieved.

It is noted that, although the above-described second embodiment has explained the usage of iron powder sensor 250 in a single abrasion sensing method, it is desirable to define the frequency of above-described abrasion sensing based on the detected value of the amount of iron powder by iron powder sensor 250. For example, when the amount of iron powder (iron powder concentration) is very small, the above-described abrasion sensing is executed every half a year. The period of abnormality sensing may be shortened as the amount of iron powder (iron powder concentration) increases. This is because the present abrasion sensing method merely presumes the amount of abrasion of only tooth planes of gears being engaged, and damage, if any, such as great abrasion and/or peeling, occurring on a tooth plane which is not a target, cannot be sensed.

It is noted that, in place of the amount of iron powder, it is also effective to detect the amount of vibration of gearbox 40 and its surroundings using a vibration sensor and to define the frequency of abrasion sensing based on a detected value of the vibration sensor.

Third Embodiment

Since the sliding ratio of a rolling bearing is generally small enough as compared with the sliding ratio of a gear, bearing abrasion in gearbox 40 shall be able to be disregarded in the first embodiment. Actually, however, abrasion progresses in bearings as well, and when the bearings are worn out, gear backlash changes, which may cause transmission efficiency to deteriorate and the gears to be damaged. Therefore, this third embodiment will present a gear or bearing abrasion sensing device.

The overall structure of a wind turbine generation apparatus in this third embodiment is identical to that of the first embodiment shown in FIGS. 1 to 3.

Referring again to FIG. 2, a control device 80B in the third embodiment determines the presence/absence of gear or bearing abrasion in gearbox 40 by comparing a detected value of rotation angle sensor 70 after reversing nacelle 90 (second detected value) with a detected value of rotation angle sensor 70 before reversing nacelle 90 (first detected value).

That is, when the gears or bearings of gearbox 40 are worn out, backlash increases due to gear displacement or abrasion of tooth planes. Therefore, in this third embodiment, when the difference between the first detected value and the second detected value (rotation angle difference) exceeds a predetermined threshold value, it shall be determined that the gears or bearings of gearbox 40 are worn out.

It is noted that the remaining configuration of control device 80B is identical to that of control device 80 in the first embodiment.

Referring again to FIG. 6, when the difference between the first detected value and the second detected value (rotation angle difference) exceeds a predetermined threshold value, determination unit 230B of control device 80B determines that gear or bearing abrasion in gearbox 40 has occurred.

It is noted that this threshold value may be defined based on gear backlash, bearing inner clearance and elastic deformation of each component. It is noted that, to assume every combination of components whose processing tolerances fall within a normal range to be normal, the threshold value needs to be set at a value with a margin, as described above. In this case, since the difference between the above-described initial value of the rotation angle difference and the above-described threshold value is great, and abrasion may be undetectable unless excessively great abrasion occurs in the gears and/or bearings. For example, when gear backlash is small, abrasion is undetectable unless bearing inner clearance becomes excessively large. However, when the bearing inner clearance becomes excessively large, the number of rolling elements that receive loads within a bearing will decrease, and the maximum contact pressure will increase. As a result, excessively large bearing inner clearance causes a shortened bearing life, which is not preferable.

Therefore, similarly to the first embodiment, it is preferable to measure the above-described rotation angle difference in the state where abrasion has not progressed, and to define the above-described threshold value based on its initial value. For example, the above-described threshold value may be defined with reference to a value measured immediately after manufacture of the wind turbine generation apparatus (before transport to the field), or immediately after installation or start of operation of the wind turbine generation apparatus.

Referring again to FIG. 7, in this third embodiment, wind turbine generation apparatus 10 wirelessly transmits the determination result of gear or bearing abrasion in gearbox 40 to a communications server. It can thereby be recognized in monitoring server 330 distant from wind turbine generation apparatus 10 whether or not gear or bearing abrasion has occurred in gearbox 40 of wind turbine generation apparatus 10.

Figure 11:
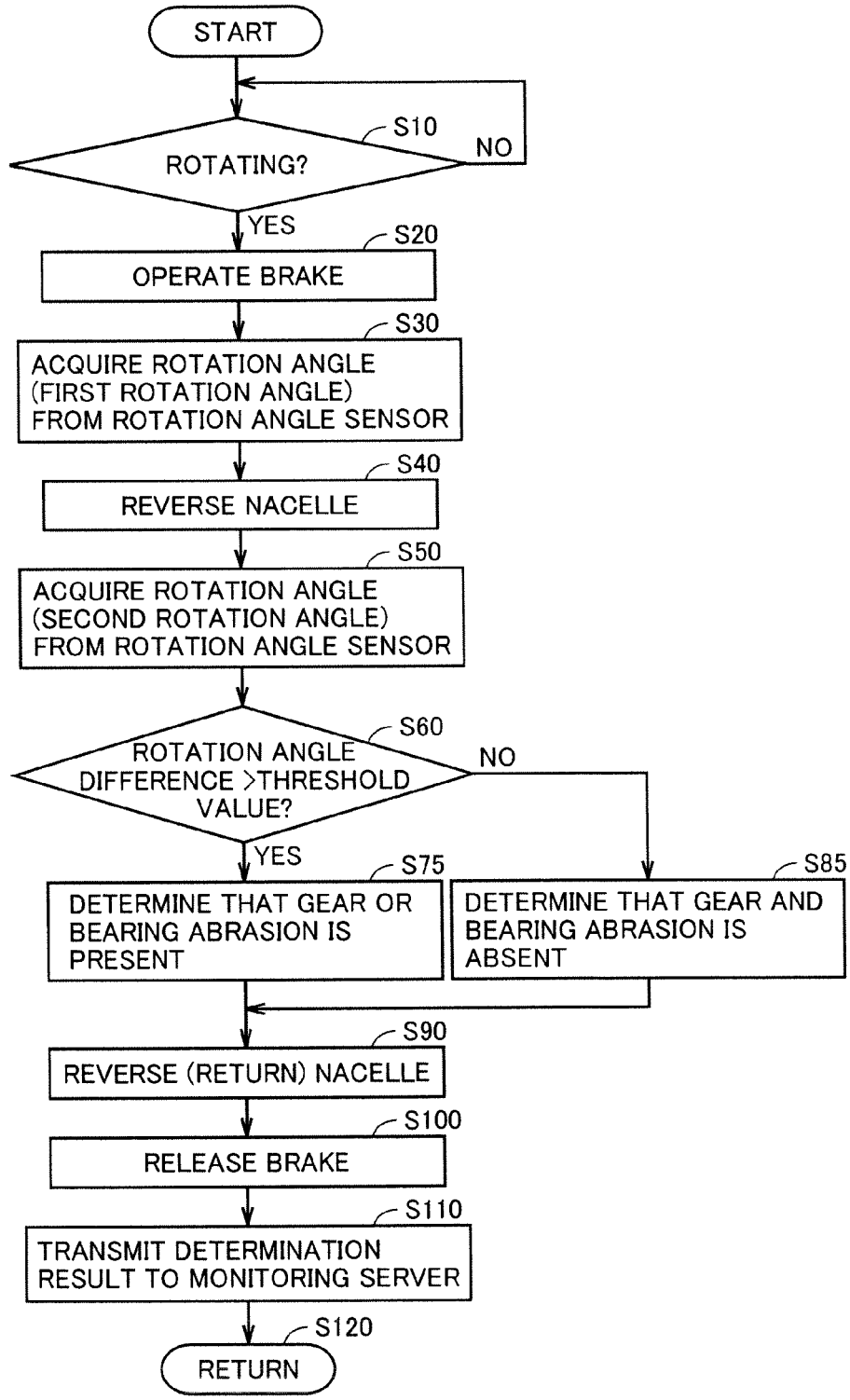
FIG. 11 is a flowchart for explaining a sequential procedure of abrasion detection processing in a third embodiment.

FIG. 11 is a flowchart for explaining a sequential procedure of abrasion detection processing in the third embodiment. It is noted that processing of this flowchart is also invoked from a main routine and executed when a predetermined time has elapsed since execution of previous abrasion sensing processing, for example.

Referring to FIG. 11, this flowchart includes Steps S75 and S85 in place of Steps S70 and S80 in the flowchart shown in FIG. 8, respectively. That is, when it is determined in Step S60 that the rotation angle difference of main shaft 20 before and after reversing the nacelle is greater than a threshold value (YES in Step S60), control device 80B determines that gear or bearing abrasion has occurred in gearbox 40 (Step S75). On the other hand, when it is determined in Step S60 that the rotation angle difference of main shaft 20 before and after reversing the nacelle is less than or equal to the threshold value (NO in Step S60), control device 80B determines that gear or bearing abrasion has not occurred in gearbox 40 (Step S85).

It is noted that, in the above description, the gear or bearing abrasion sensing shall be executed in the first embodiment, however, the gear or bearing abrasion sensing may be executed in the second embodiment.

As described above, according to this third embodiment, gear or bearing abrasion in gearbox 40 in wind turbine generation apparatus 10 can be detected at low cost and easily. Moreover, according to this third embodiment, the presence/absence of gear or bearing abrasion in gearbox 40 can be monitored at a remote place, which facilitates maintenance of gearbox 40.

Fourth Embodiment

In each of the above-described embodiments, rotational torque exerted on main shaft 20 by wind force shall be reversed by reversing the nacelle. In this fourth embodiment, rotational torque is reversed by changing the pitch angle of blade 30 (angle of a blade's wind receiving surface), instead of reversing nacelle 90.

The overall structure of the wind turbine generation apparatus in this fourth embodiment is identical to that of the third embodiment.

Figure 12:
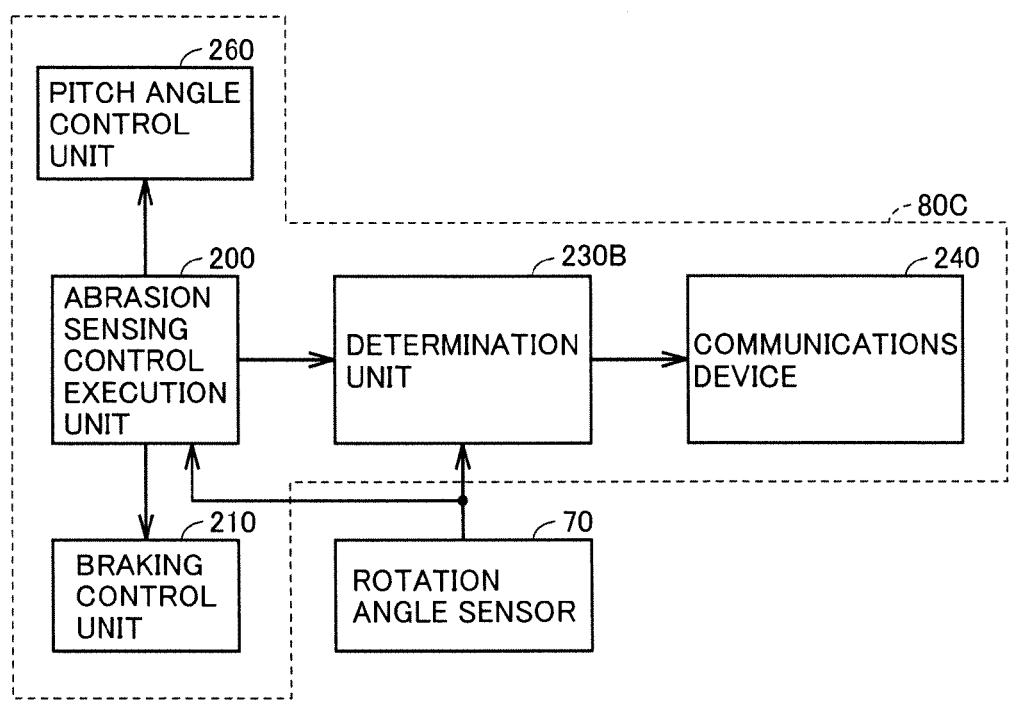
FIG. 12 is a functional block diagram of a control device in a fourth embodiment.

FIG. 12 is a functional block diagram of a control device in the fourth embodiment. Referring to FIG. 12, a control device 80C includes a pitch angle control unit 260 in place of yaw control unit 220 in the configuration of control device 80B shown in FIG. 6.

Upon receipt of a command from abrasion sensing control execution unit 200, pitch angle control unit 260 outputs a driving command for changing the pitch angle of blade 30 (e.g., rotating by approximately 90 degrees) from the current position to a blade pitch angle driving device (not shown) so as to reverse rotational torque exerted on main shaft 20 by wind force.

It is noted that the remaining configuration of control device 80C is identical to that of control device 80B shown in FIG. 6.

Figure 13:
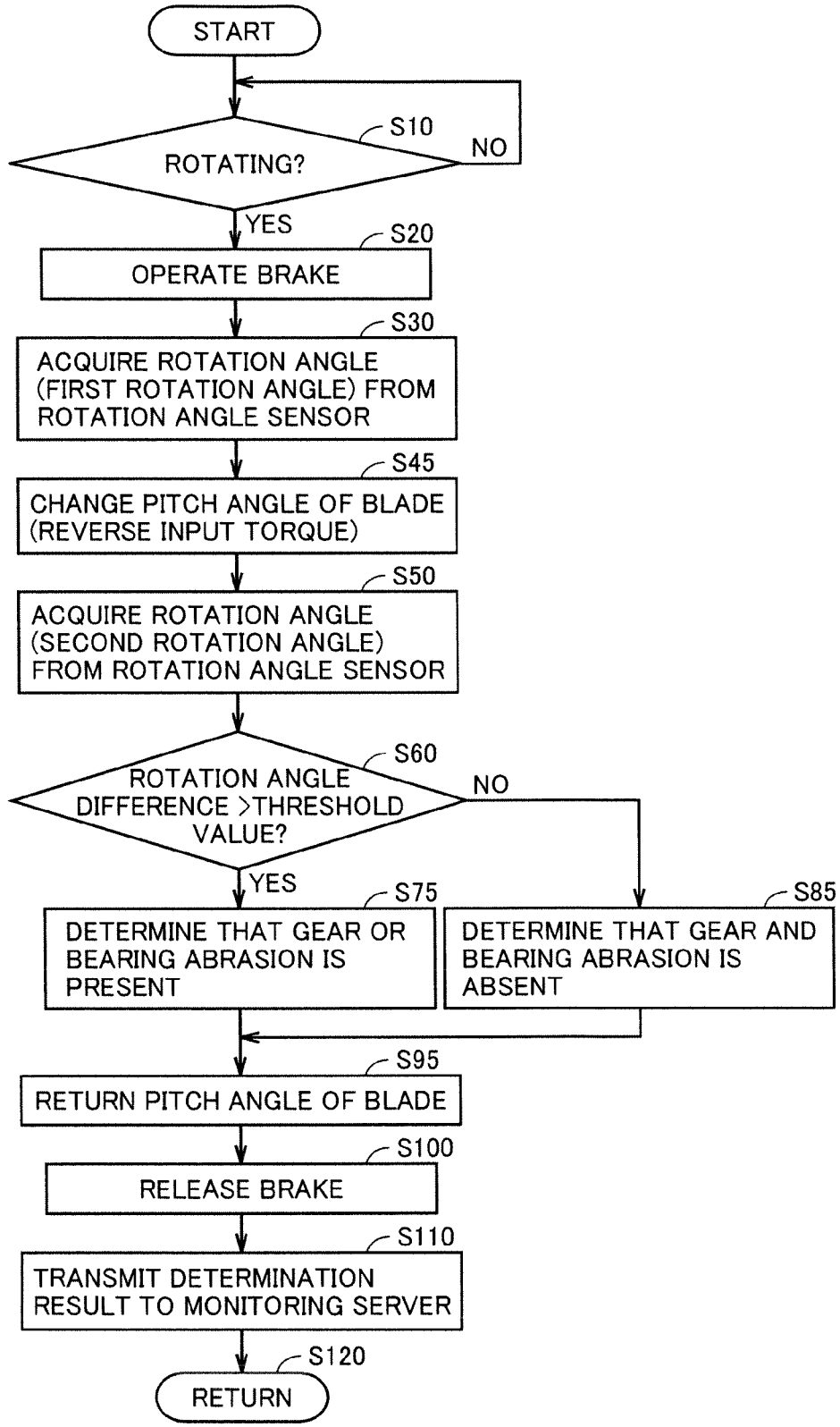
FIG. 13 is a flowchart for explaining a sequential procedure of abrasion detection processing in the fourth embodiment.

FIG. 13 is a flowchart for explaining a sequential procedure of abrasion detection processing in the fourth embodiment. It is noted that processing of this flowchart is also invoked from a main routine and executed when a predetermined time has elapsed since execution of previous abrasion sensing processing, for example.

Referring to FIG. 13, this flowchart includes Steps S45 and S95 in place of Steps S40 and S90 in the flowchart shown in FIG. 11, respectively. That is, when the first rotation angle is acquired in Step S30, control device 80C changes the pitch angle of blade 30 (e.g., rotates by approximately 90 degrees) so as to reverse the rotational torque exerted on main shaft 20 by wind force while braking device 60 is being operated (Step S45). Thereafter, the process proceeds to Step S50, where the second rotation angle is acquired.

Moreover, after the determination of presence/absence of abrasion is terminated in Step S75 or Step S85, control device 80C returns the pitch angle of blade 30 changed in Step S45 to its original angle (Step S95). Thereafter, the process proceeds to Step S100, where braking by braking device 60 is relieved.

It is noted that, in the above description, the pitch angle of blade 30 shall be changed instead of reversing nacelle 90 in the third embodiment, however, the pitch angle of blade 30 may be changed instead of reversing nacelle 90 in the first and second embodiments.

As described above, according to this fourth embodiment, since rotational torque exerted on main shaft 20 by wind force is reversed by changing the pitch angle of blade 30, abrasion sensing can be carried out for a shorter time or with less energy as compared with the case of reversing nacelle 90.

It is noted that, in each of the above-described embodiments, torque input to gearbox 40 differs depending on wind force and operating conditions of braking device 60. Since the amount of elastic deformation of component will change when torque input to gearbox 40 changes, it is preferable to perform compensation with the input torque in order to perform abrasion sensing of higher precision. For example, the difference between the first detected value and the second detected value (rotation angle difference) may be divided by input torque. However, the amount of displacement relative to load between the inner and outer rings of a bearing has a nonlinear shape, and it is more preferable to perform abrasion sensing based on a measured value (rotation angle difference) independent of input torque.

That is, when taking a form error of component and the like into consideration as well, it is more preferable to set input torque to fall within a certain range than performing compensation with input torque. For example, it is possible to set input torque to fall within a certain range by providing a device (a torque sensor etc.) that can measure torque input to gearbox 40 and adjusting the angle of blade 30 and/or the orientation of nacelle 90 based on a measured value of input torque.

It is noted that, since transporting the present device to the nacelle each time abrasion sensing is performed requires great labor, it is preferable to mount the abrasion sensing device on the wind turbine generation apparatus in spite of increased cost and weight.

It is noted that, in the above description, abrasion sensing control execution unit 200, yaw control unit 220 and yaw driving device 110 of control devices 80, 80A and 80B constitute one embodiment of a "driving control unit" in the present invention, and iron powder sensor 250 corresponds to one embodiment of a "sensor" in the present invention. Abrasion sensing control execution unit 200 and pitch angle control unit 260 of control device 80C also constitute one embodiment of the "driving control unit" in the present invention.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST

10 wind turbine generation apparatus; 20 main shaft; 30 blade; 40 gearbox; 50 power generator; 60 braking device; 70 rotation angle sensor; 80, 80A to 80C control device; 90 nacelle; 100 tower; 110 yaw driving device; 120 outer ring gear; 120A, 123A to 128A gear portion; 121 input shaft; 122 planetary carrier; 123 planetary gear; 124 low-speed shaft; 125 low-speed gear; 126 mid-speed shaft; 127 mid-speed gear; 128 high-speed shaft; 129 housing; 200 abrasion sensing control execution unit; 210 braking control unit; 220 yaw control unit; 230, 230A, 230B determination unit; 240 communications device; 250 iron powder sensor; 260 pitch angle control unit; 310 communications server; 320 Internet; 330 monitoring server.

The invention claimed is:

1. An abrasion sensing device sensing abrasion of one of a gear and a bearing of a gearbox provided in a wind turbine generation apparatus,
    said wind turbine generation apparatus including
        a blade converting wind force into rotary force,
        a main shaft receiving said rotary force from said blade,
        said gearbox speeding up rotation of said main shaft,
        a power generator connected to an output shaft of said gearbox, and
        a nacelle storing said main shaft, said gearbox and said power generator, and being rotatably supported at an upper part of a support,
    said abrasion sensing device comprising:
    a braking device for holding the output shaft of said gearbox in a non-rotating state;
    a rotation angle sensor for detecting a rotation angle of said main shaft;
    a control unit for reversing, by changing a wind receiving state by said blade, the direction of the rotary force exerted on said main shaft by wind force; and a determination unit determining presence/absence of abrasion of one of said gear and said bearing by comparing a first detected value of said rotation angle sensor before reversing the direction of said rotary force by said control unit and a second detected value of said rotation angle sensor after reversing the direction of said rotary force by said control unit while said braking device is being operated.

2. The abrasion sensing device according to claim 1, wherein
said control unit includes a driving control unit for reversing said nacelle, and
said determination unit determines the presence/absence of abrasion of one of said gear and said bearing by comparing said first detected value before reversing said nacelle and said second detected value after reversing said nacelle by said driving control unit while said braking device is being operated.

3. The abrasion sensing device according to claim 1, wherein
said control unit includes a driving control unit for reversing, by changing the angle of said blade, the direction of the rotary force exerted on said main shaft by wind force, and
said determination unit determines the presence/absence of abrasion of one of said gear and said bearing by comparing said first detected value before changing the angle of said blade and said second detected value after changing the angle of said blade by said driving control device while said braking device is being operated.

4. The abrasion sensing device according to claim 1, wherein when a difference between said first detected value and said second detected value exceeds a predetermined threshold value, said determination unit determines that one of said gear and said bearing is worn out.

5. The abrasion sensing device according to claim 4, wherein said threshold value is defined based on backlash of said gear, bearing inner clearance and elastic deformation of a component of said gearbox.

6. The abrasion sensing device according to claim 1, wherein said determination unit starts processing of determining the presence/absence of abrasion of one of said gear and said bearing when said blade is rotating while receiving wind force.

7. The abrasion sensing device according to claim 1, further comprising a sensor for detecting torque generated by said wind turbine generation apparatus having received wind force, wherein
said determination unit determines the presence/absence of abrasion of one of said gear and said bearing based on a value obtained by compensating for a difference between said first detected value and said second detected value with a detected value of said sensor.

8. The abrasion sensing device according to claim 1, further comprising:
a sensor for detecting torque generated by said wind turbine generation apparatus having received wind force; and
a control unit controlling a detected value of said sensor to fall within a certain range by controlling at least one of the angle of said blade and the orientation of said nacelle.

9. The abrasion sensing device according to claim 1, further comprising an iron powder sensor for detecting the amount of iron powder in a lubricating oil of said gearbox, wherein
said determination unit determines the presence/absence of abrasion of one of said gear and said bearing further using a detected value of said iron powder sensor.

10. The abrasion sensing device according to claim 1, further comprising a vibration sensor for detecting the amount of vibration of one of said gearbox and a surrounding thereof, wherein
said determination unit determines the presence/absence of abrasion of one of said gear and said bearing further using a detected value of said vibration sensor.

11. The abrasion sensing device according to claim 1, further comprising a communications device for wirelessly transmitting a determination result by said determination unit to a remote receiving device.

12. A wind turbine generation apparatus comprising the abrasion sensing device as defined in claim 1.

13. An abrasion sensing method for sensing abrasion of one of a gear and a bearing of a gearbox provided in a wind turbine generation apparatus,
said wind turbine generation apparatus including
a blade converting wind force into rotary force,
a main shaft receiving said rotary force from said blade,
said gearbox speeding up rotation of said main shaft,
a power generator connected to an output shaft of said gearbox,
a nacelle storing said main shaft, said gearbox and said power generator, and being rotatably supported at an upper part of a support,
a braking device for holding the output shaft of said gearbox in a non-rotating state, and
a rotation angle sensor for detecting a rotation angle of said main shaft,
said abrasion sensing method comprising the steps of:
operating said braking device;
detecting a first rotation angle indicating the rotation angle of said main shaft;
reversing, by changing a wind receiving state by said blade, the direction of rotary force exerted on said main shaft by wind force;
detecting a second rotation angle indicating the rotation angle of said main shaft after reversing the direction of said rotary force; and
determining presence/absence of abrasion of one of said gear and said bearing by comparing said first rotation angle and said second rotation angle.

14. The abrasion sensing method according to claim 13, wherein
said step of reversing the direction of said rotary force includes the step of reversing said nacelle, and
said step of detecting said second rotation angle includes the step of detecting said second rotation angle after reversing said nacelle.

15. The abrasion sensing method according to claim 13, wherein
said step of reversing the direction of said rotary force includes the step of reversing, by changing the angle of said blade, the direction of the rotary force exerted on said main shaft by wind force, and
said step of detecting said second rotation angle includes the step of detecting said second rotation angle after changing the angle of said blade.

* * * * *